United States Patent
Sridharan et al.

(10) Patent No.: US 12,451,742 B2
(45) Date of Patent: Oct. 21, 2025

(54) METHOD AND APPARATUS FOR COOLING A ROTOR ASSEMBLY

(71) Applicant: GE AVIATION SYSTEMS LLC, Grand Rapids, MI (US)

(72) Inventors: Balamurugan Sridharan, Bengaluru (IN); Anirban Chatterjee, Bengaluru (IN); Sarveshwar Chandrakant Wadgaonkar, Bengaluru (IN)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 552 days.

(21) Appl. No.: 17/883,655

(22) Filed: Aug. 9, 2022

(65) Prior Publication Data

US 2023/0336043 A1    Oct. 19, 2023

(30) Foreign Application Priority Data

Apr. 19, 2022   (IN) .............................. 202211023026

(51) Int. Cl.
    *H02K 1/32*      (2006.01)
    *H02K 9/19*      (2006.01)

(52) U.S. Cl.
CPC ............. *H02K 1/32* (2013.01); *H02K 9/19* (2013.01)

(58) Field of Classification Search
CPC .. H02K 3/12; H02K 3/24; H02K 3/28; H02K 3/32; H02K 3/46; H02K 9/20; H02K 9/193; H02K 9/19; H02K 1/32
USPC ................................................ 310/54, 59, 61
See application file for complete search history.

(56) References Cited

U.S. PATENT DOCUMENTS

| | | | |
|---|---|---|---|
| 886,035 A | 4/1908 | Behrend | |
| 922,946 A | 5/1909 | Pomeroy | |
| 2,894,155 A | 7/1959 | Labastie | |
| 5,237,227 A | 8/1993 | Huss | |
| 6,412,289 B1 * | 7/2002 | Laskaris | H02K 9/193 62/50.7 |
| 6,903,470 B2 | 6/2005 | Doherty et al. | |
| 9,812,917 B2 * | 11/2017 | Himmelmann | H02K 3/46 |
| 9,837,868 B2 | 12/2017 | Wirsch, Jr. et al. | |
| 10,135,319 B2 | 11/2018 | Hanumalagutti et al. | |
| 10,554,088 B2 | 2/2020 | Huang et al. | |

(Continued)

FOREIGN PATENT DOCUMENTS

WO     2009135742 A2     11/2009

*Primary Examiner* — Oluseye Iwarere
*Assistant Examiner* — Justin Stefanon
(74) *Attorney, Agent, or Firm* — Thomas | Horstemeyer, LLP (57) ABSTRACT

A method of cooling rotor winding end turns extending from a rotor core includes coupling a collar to a rotatable shaft of the rotor core. The collar has a first wall confronting the rotor core, a second wall spaced from and opposing the first wall, a third wall between the first and second walls defining a set of apertures therethrough, a first cavity cooperatively defined by the first, second and third walls, having a first opening opposing the third wall, a fourth wall circumscribing the third wall, a second cavity cooperatively defined by the second, third and fourth walls, the second cavity defining a second opening opposing the second wall. The first and second cavities are in fluid communication, and the rotor winding end turns are receivable into the second cavity. The method includes directing a coolant into the first cavity, and delivering the coolant to the second cavity.

20 Claims, 8 Drawing Sheets

(56) References Cited

U.S. PATENT DOCUMENTS

| | | | |
|---|---|---|---|
| 11,025,114 B2 | 6/2021 | Sridharan et al. | |
| 11,038,394 B2 | 6/2021 | Chhabra et al. | |
| 12,142,967 B2* | 11/2024 | Bremner | H02K 5/15 |
| 2011/0133579 A1* | 6/2011 | Vanderzyden | H02K 3/527 |
| | | | 310/43 |
| 2020/0106342 A1* | 4/2020 | Chatterjee | H02K 9/193 |
| 2020/0212742 A1* | 7/2020 | Sridharan | H02K 9/19 |
| 2022/0216761 A1* | 7/2022 | Danckers | H02K 1/20 |

* cited by examiner

METHOD AND APPARATUS FOR COOLING A ROTOR ASSEMBLY

CROSS-REFERENCE TO RELATED APPLICATIONS

The present application claims the benefit of IN patent application No. 202211023026, filed Apr. 19, 2022, which is incorporated herein by reference, in its entirety.

BACKGROUND

Electric machines, such as electric motors or electric generators, are used in energy conversion. Such electrical machines operate through the interaction of magnetic fields, and current carrying conductors generate the force or electricity respectively. Typically, an electrical motor converts electrical energy into mechanical energy. Conversely, an electrical generator converts mechanical energy into electrical energy. For example, in the aircraft industry, it is common to combine a motor mode and a generator mode in the same electric machine, where the electric machine in motor mode functions to start the engine, and, depending on the mode, also functions as a generator.

Regardless of the mode, an electric machine typically includes a rotor having rotor windings that are driven to rotate by a source of rotation, such as a mechanical or electrical machine, which for some aircraft may be a gas turbine engine. Heat is generated in the rotor due to the flow of current through the windings, and changing magnetic fields present in the rotor, causing the temperature to rise in the rotor. It is desirable to cool the rotor to protect the electrical machine from damage and to increase the electrical machine power density to allow for more power from a smaller physically sized electric motor.

DETAILED DESCRIPTION

Aspects of the disclosure can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "wet" cavity generator includes a cavity housing the rotor and stator that is exposed to free liquid coolant (e.g. coolant freely moving within the cavity). In contrast, in a "dry" cavity generator, the rotor and stator can be cooled by coolant contained within fluidly sealed passages (e.g. non-freely moving about the cavity).

The exemplary drawings are for purposes of illustration only and the dimensions, positions, order and relative sizes reflected in the drawings attached hereto can vary.

Figure 1:
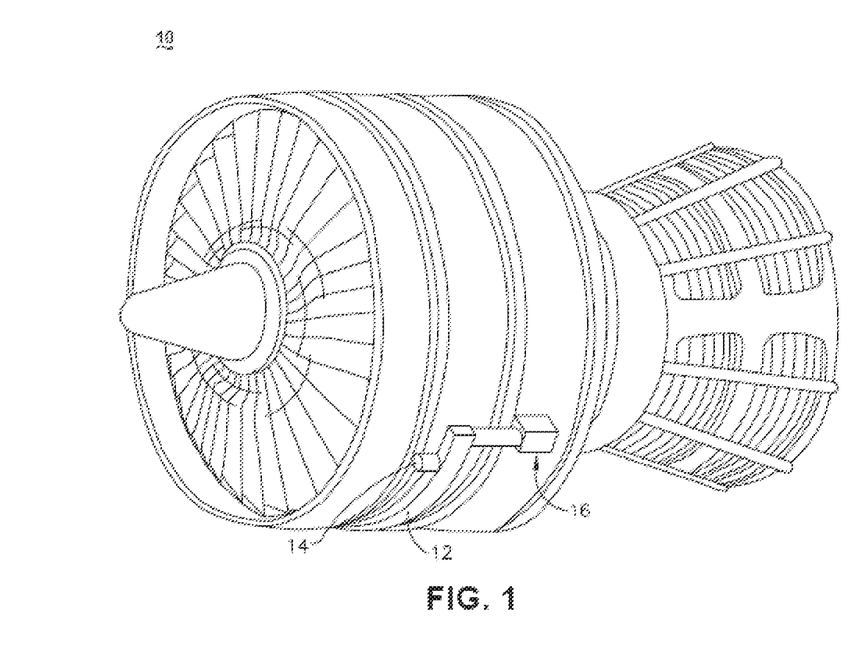
FIG. 1 is an isometric view of a gas turbine engine having a generator, in accordance with various aspects described herein.

FIG. 1 illustrates a gas turbine engine 10 having an accessory gear box (AGB) 12 and an electric machine or generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein.

While a generator 14 is shown and described, aspects of the disclosure are not so limited, and aspects can include any electrical machine, such as, without limitation, a motor, or generator.

Figure 2:
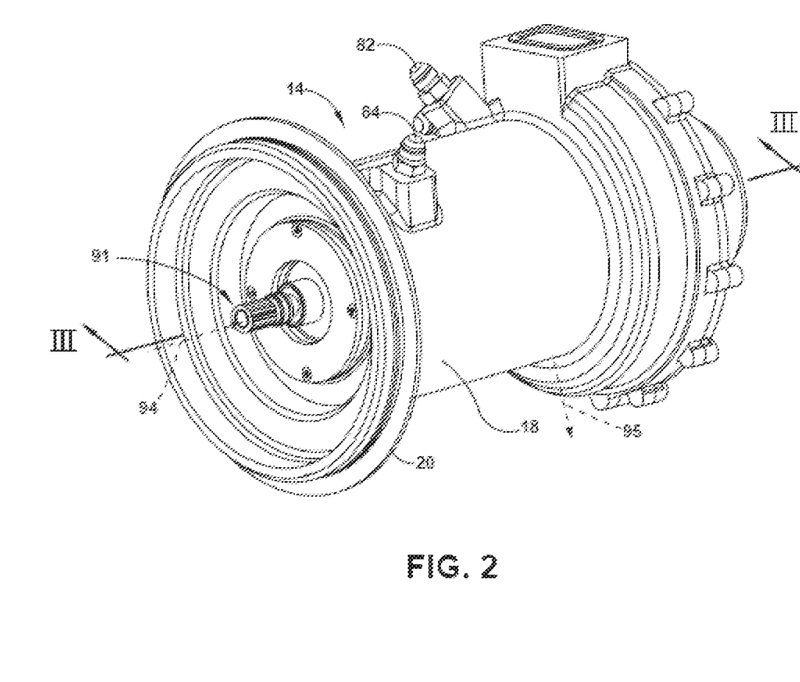
FIG. 2 is an isometric view of an exterior of the generator of FIG. 1, in accordance with various aspects described herein.

FIG. 2 more clearly illustrates a non-limiting example of the generator 14 and its housing 18 in accordance with aspects of the disclosure. The generator 14 can include a clamping interface 20, used to clamp the generator 14 to the AGB 12 (not shown in FIG. 2). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet and outlet ports 82, 84 can be utilized for cooling at least a portion of a rotor or stator of the generator 14. The liquid cooling system can also include a second coolant outlet port 91, shown at a rotatable shaft portion of the generator 14. Optionally, by way of non-limiting example, the liquid cooling system can include a rotatable shaft coolant inlet port 94 or a generator coolant outlet port 95. While not shown, aspects of the disclosure can further include other liquid cooling system components, such as a liquid coolant reservoir fluidly coupled with the cooling fluid inlet port 82, the rotatable shaft coolant inlet port 94, the cooling fluid outlet port 84, or the generator coolant outlet port 95, and a liquid coolant pump to forcibly supply the coolant through the ports 82, 84, 94, 95 or generator 14.

Figure 3:
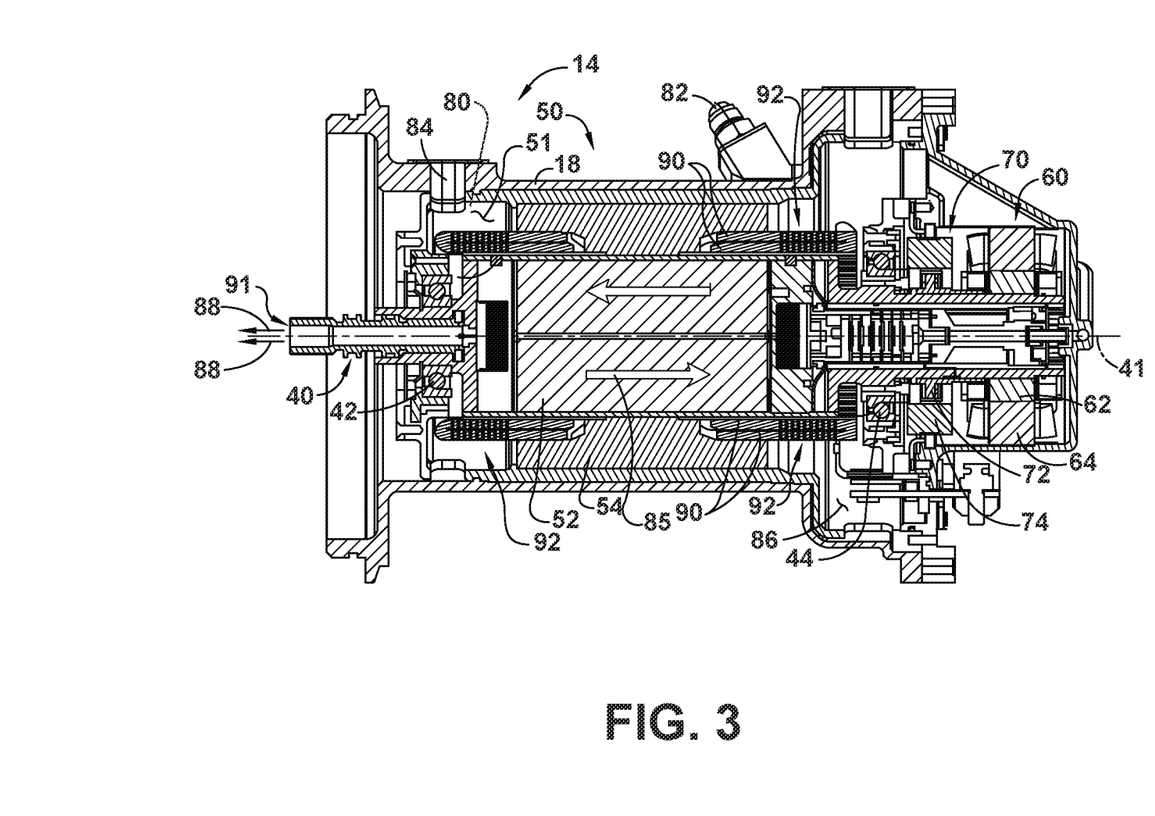
FIG. 3 is a schematic cross-sectional view of the generator of FIG. 2, taken along line III-III of FIG. 2, in accordance with various aspects described herein.

A non-limiting interior of the generator 14 is best seen in FIG. 3, which is a cross-sectional view of the generator 14 shown in FIG. 2 taken along line III-III. A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74. In this manner, the main machine rotor 52, exciter rotor 62, and PMG rotor 72 are disposed on and co-rotate with the rotatable shaft 40. The fixed components can be mounted to any suitable part of the housing 18, and include the main machine stator 54, exciter stator 64, and PMG stator 74. Collectively, the fixed components define an interior through which the rotatable shaft 40 extends and rotates relative thereto.

It will be understood that the main machine rotor 52, exciter rotor 62, and PMG rotor 72 can have a set of rotor poles, and that the main machine stator 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn. Aspects of the disclosure shown include at least one set of stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a main machine stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the generator 14 can be oil cooled and thus can include a cooling system 80. The cooling oil can be used to dissipate heat generated by the electrical and mechanical functions of the generator 14. The cooling system 80 using oil can also provide for lubrication of the generator 14. In the illustrated aspects, the generator 14 can be a liquid cooled, wet cavity cooling system 80 including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more channels or paths for coolant or fluid coolant flow 85 (shown schematically as arrows) for the main machine rotor 52, exciter rotor 62, and PMG rotor 72, as well as a rotor shaft cooling fluid outlet 88, such as the second coolant outlet port 91, wherein residual, unused, or unspent oil can be discharged from the rotatable shaft 40. For example, the rotatable shaft 40 can define a first radial coolant passage 144 (shown in FIG. 6).

In non-limiting examples of the generator 14, the fluid coolant flow 85 can further be distributed, directed, exposed, sprayed, or otherwise deposited onto the set of stator windings 90, the set of stator winding end turns 92, or onto alternative or additional components. In this example, the fluid coolant flow 85 can flow from the rotatable shaft 40 radially outward toward the set of stator windings 90 or the set of stator winding end turns 92. In this sense, the coolant can cool the respective set of stator windings 90 or set of stator winding end turns 92.

Figure 4:
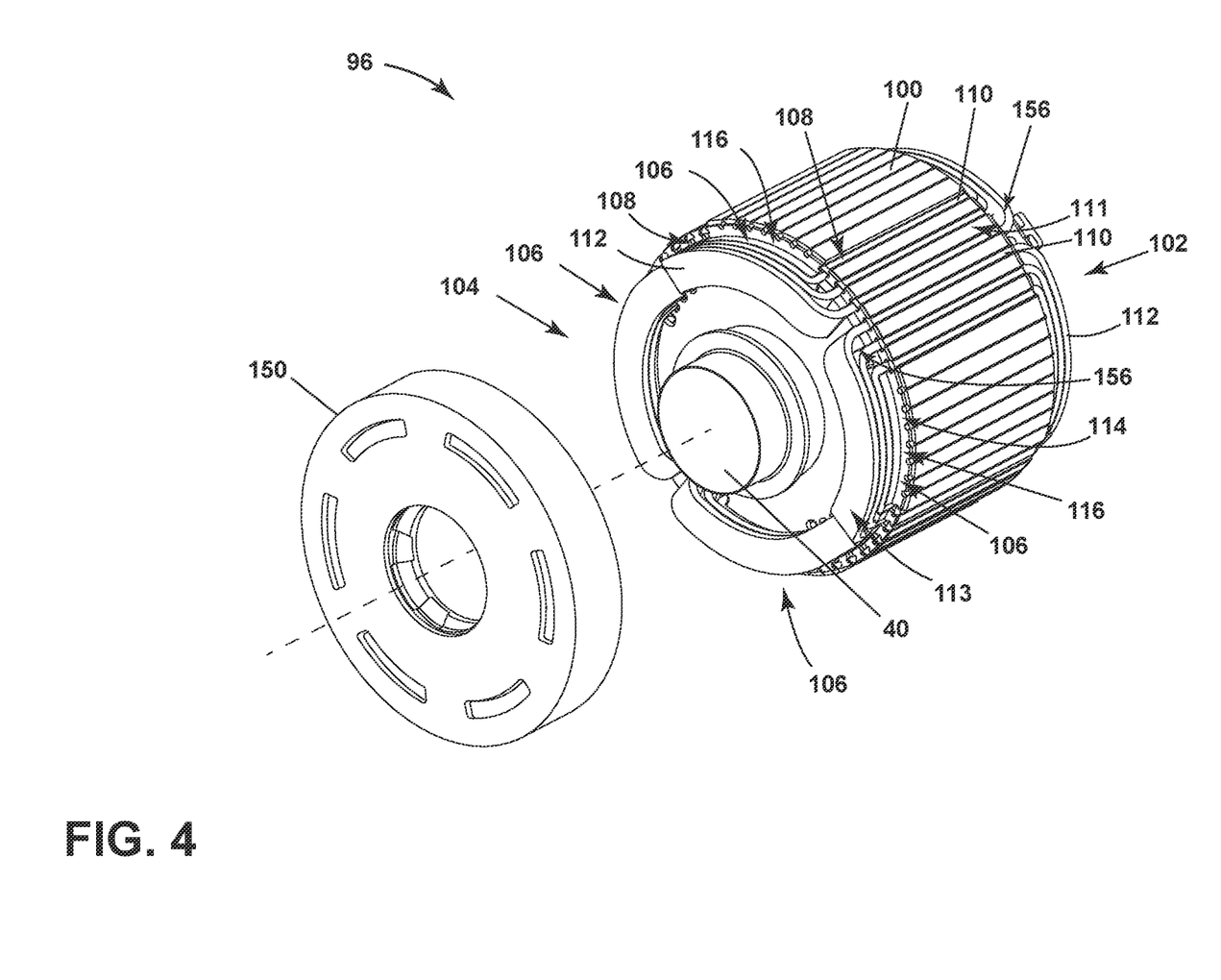
FIG. 4 illustrates a partially exploded isometric view of a rotor assembly and coil containment collar for the generator of FIG. 3, in accordance with various aspects described herein.

FIG. 4 illustrates an isometric partially exploded view of a rotor assembly 96 of the main electrodynamic machine 50. The rotor assembly 96 can define a first axial end 102 and an opposing second axial end 104, axially spaced from the first axial end 102. As shown, the rotor assembly 96 can include a rotor core 100, such as a laminated rotor core 100, rotatably connected to co-rotate with the rotatable shaft 40 and supporting at least one rotor pole 106. The rotor assembly 96 can further include a coil containment collar 150.

In the illustration of FIG. 4, an aspect comprising four rotor poles 106 is shown. Other aspects are not so limited, and rotor assembly 96 can alternatively have fewer than four rotor poles 106, or more than four poles 106, without departing from the scope of the disclosure, and aspects can be adapted to rotor assemblies 96 having any desired number of rotor poles 106. Each rotor pole 106 can include a set of conductive rotor wiring or rotor windings 110 wound about a portion of the rotor core 100. For example, in non-limiting aspects, the rotor core 100 can define a set of slots 108 thereon. The slots 108 can comprise a respective longitudinal axis extending axially along the rotor core 100. The slots 108 can be circumferentially spaced from each other. In non-limiting aspects, the slots 108 can be disposed about a periphery of the rotor core 100. The slots 108 can be sized to receive a respective rotor winding 110 therein. The rotor windings 110 disposed within the slots 108 can define an axial winding portion 111 extending axially along the rotor core 100, and rotor winding end turns 112 extending axially beyond the rotor core 100. In the perspective of the illustrated example, the slots 108 can underlie the set of rotor windings 110. While the rotor windings 110 or the rotor winding end turns 112 can refer to a set of windings or end turns, an end turn can include only one of the set of rotor windings 110, or only one portion of the set of rotor windings 110 extending axially beyond the rotor core 100, such as only at the first axial end 102 or the second axial end 104.

Figure 6:
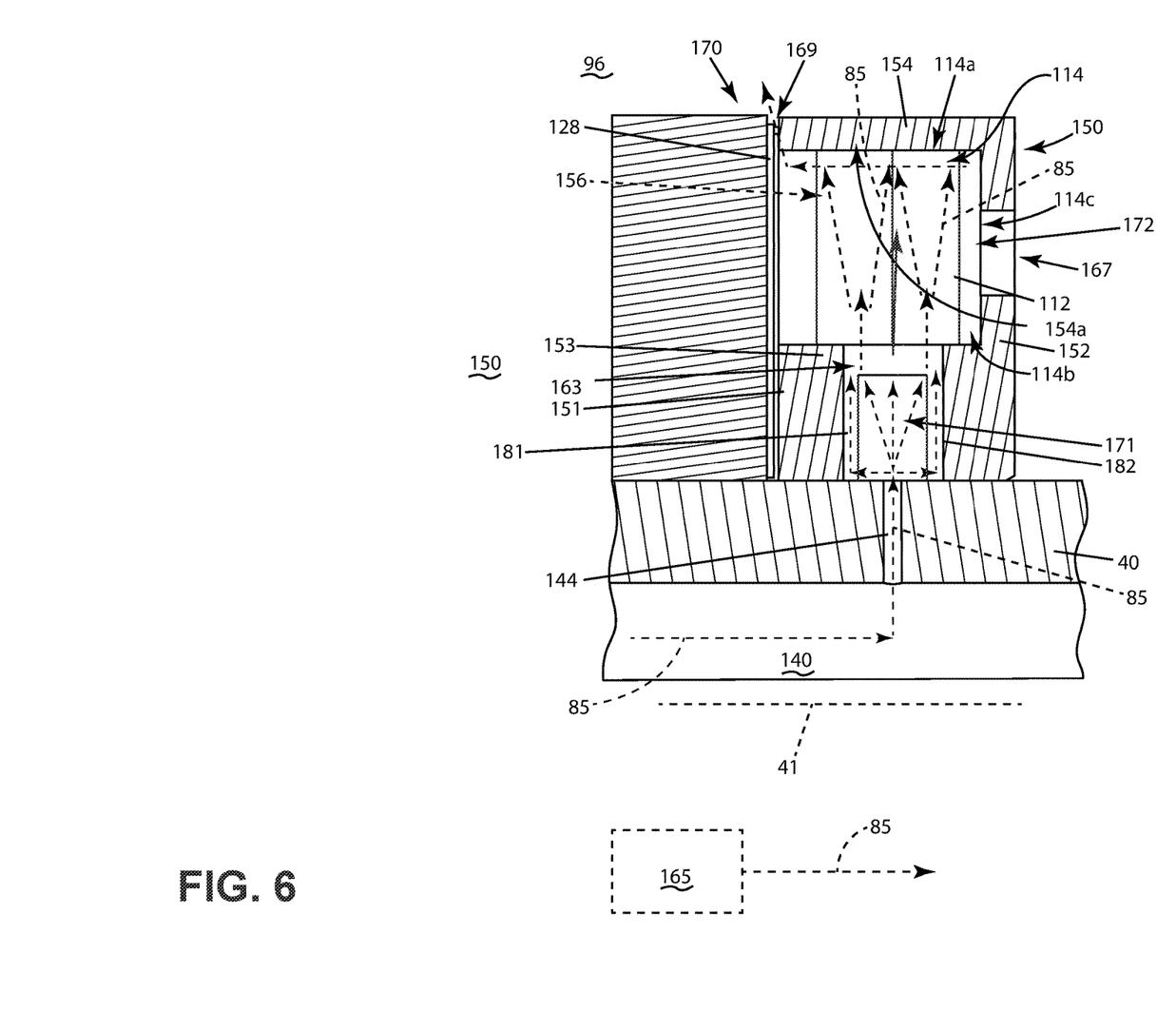
FIG. 6 illustrates a zoomed cross-sectional view of the coil containment collar of the rotor assembly of FIG. 4, in accordance with various aspects described herein.

The set of rotor winding end turns 112 can include respective loops or arcuate bight portions 113 disposed to extend axially beyond the rotor core 100 to define a respective overhang 114 having an upper surface 114a and a lower surface 114b connected by an end 114c (see. FIG. 6).

In non-limiting aspects, the overhang 114 can define a respective channel 116 extending therethrough. For example, in non-limiting aspects each respective channel 116 can have a width defined by a width and spacing between the slots 108, or a width and spacing between the rotor winding end turns 112, or both. The rotor winding end turns 112 can define a respective set of radially extending rotor end turn passages 156 disposed therebetween. Each rotor end turn passage 156 can be a radially extending passage defined between the rotor windings 110. For example, in non-limiting aspects, the rotor end turn passages 156 can include the respective channel 116 extending through a bight portion 113 defined by a respective rotor winding end turn 112. At each opposing axial end 102, 104, the set of rotor winding end turns 112 can be at least partially supported or contained by a coil containment collar 150.

As will be described in more detail herein, the coil containment collar 150 can provide a balanced support structure to contain a radially outward movement or a radially inward movement, or both, of the rotor winding end turns 112, while facilitating conveyance of the fluid coolant flow 85 to the rotor winding end turns 112. In non-limiting aspects, the coil containment collar 150 can be disposed at either axial end 102, 104 of the rotor assembly 96. For example, in some aspects, a single coil containment collar 150 can be disposed at one end of the rotor assembly 96. In other non-limiting aspects, a respective coil containment collar 150 can be disposed at both the first end 102 and opposing second end 104 of the rotor assembly 96. In such aspects, the respective containment collar 150 disposed at the opposing first and second ends 102, 104 can be substantially similar or different depending on the needs of the rotor assembly 96.

A respective coil containment collar 150 can be rotatably coupled to each end of the rotatable shaft 40 of the rotor assembly 96. For example, a respective coil containment collar 150 can be coupled to one end (e.g., the first axial end 102 or the second end 104) of the rotor assembly 96. In other aspects, a respective coil containment collar 150 can be coupled to the rotatable shaft 40 at both the first axial end 102 and the second axial end 104 of the rotor assembly 96.

Figure 5:
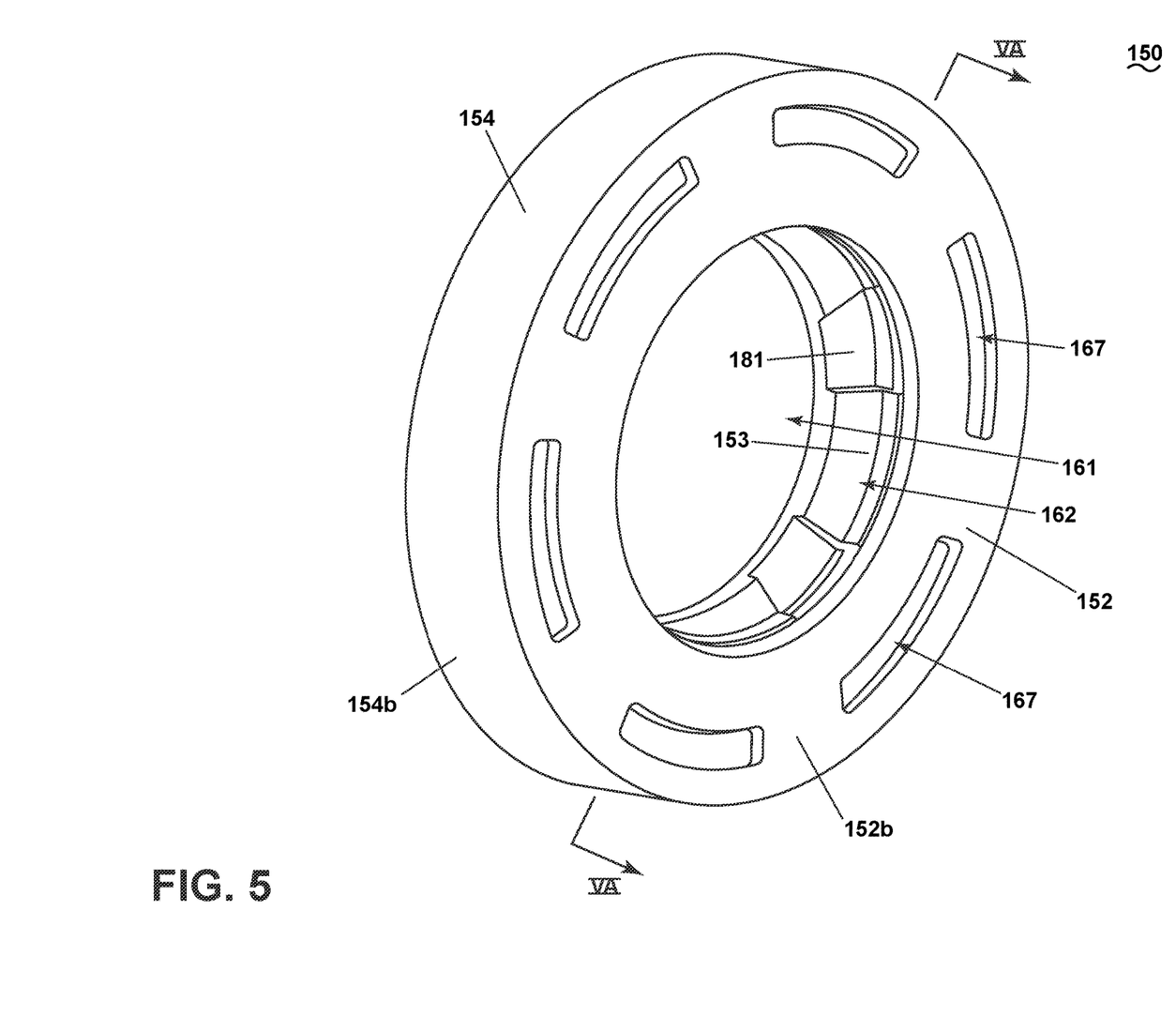
FIG. 5 illustrates a perspective view of the coil containment collar of the rotor assembly of FIG. 4, in accordance with various aspects described herein.
Figure 5A:
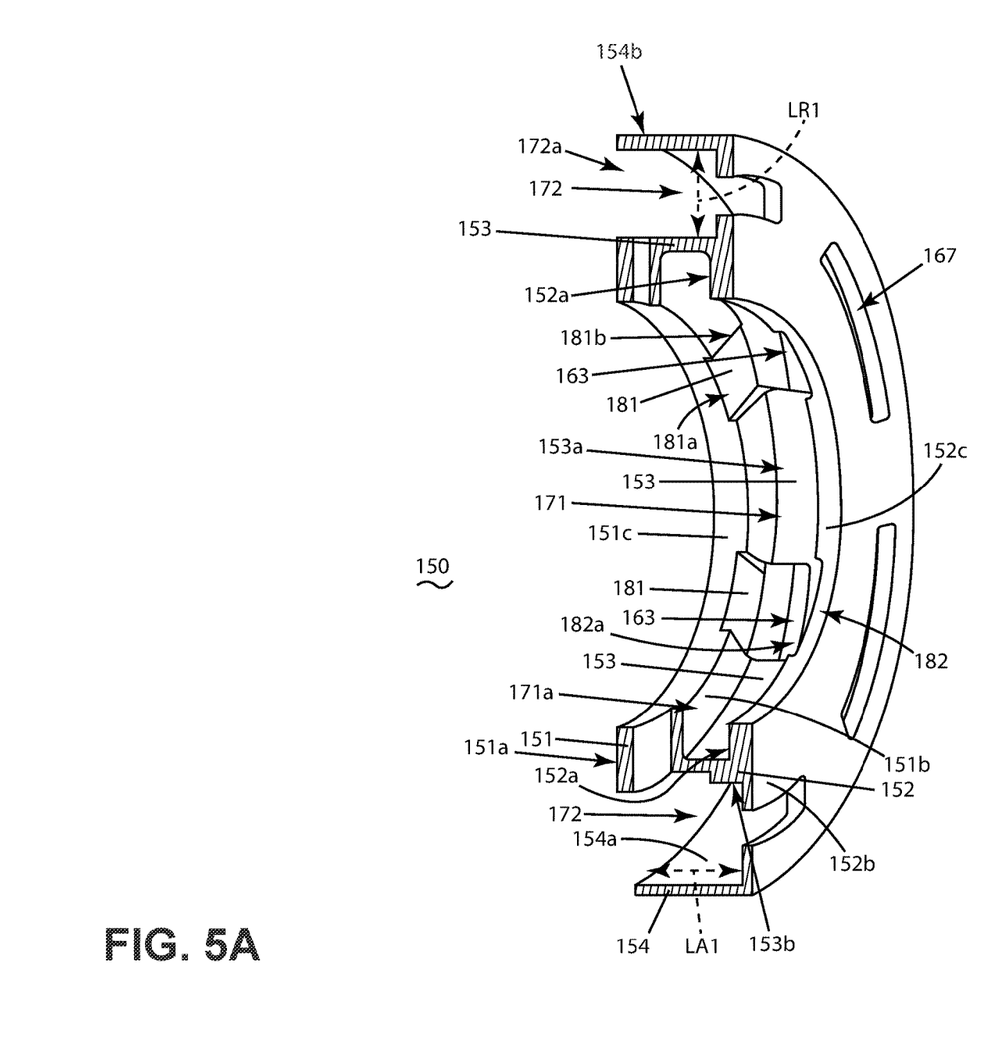
FIG. 5A illustrates a cross section view, taken along line VA-VA of the coil containment collar of FIG. 5, in accordance with various aspects described herein.

A non-limiting aspect of the coil containment collar 150 is depicted in, and will be described with simultaneous reference to, FIG. 5 and FIG. 5A. In non-limiting aspects, the coil containment collar 150 can comprise a generally annular structure. The coil containment collar 150 can include a first wall member 151, second wall member 152, a third wall member 153, a fourth wall member 154, a first cavity 171, and a second cavity 172. A first bore 161 can be defined through the first wall member 151, and a second bore 162 can be defined through the second wall member 152. The third wall member 153 can define a set of first apertures 163 therethrough.

The first wall member 151 can be disposed to confront the rotor core 100. The second wall member 152 is axially spaced from the first wall member 151 to define the first cavity 171 therebetween. The third wall member 153 can extend from the first wall member 151 to the second wall member 152. In non-limiting aspects, the first wall member 151 and the second wall member 152 can support the third wall member 153. The fourth wall member 154 can circumscribe the third wall member 153, and be spaced therefrom to define the second cavity 172 therebetween. The first cavity 171 can have a first open end 171a, and the second cavity 172 can have a second open end 172a. In non-limiting aspects, the third wall member 153 can separate the first cavity 171 from the second cavity 172. In non-limiting aspects, the third wall member 153 can partially define the first cavity 171 and the second cavity 172. The first open end 171a can be opposite the third wall member 153, and the second open end 172a can be opposite the second wall member 152.

In non-limiting aspects, one or more of the first wall member 151, second wall member 152, third wall member 153, and the fourth wall member 154 can define an annular structure. The first wall member 151 can define an axially inner surface 151a, and an opposing axially outer surface 151b. The first wall member 151 can include a circumferential third surface 151c disposed between the axially inner surface 151a, and the axially outer surface 151b (e.g., defining the first bore 161). The second wall member 152 can define an axially inner surface 152a, and an opposing axially outer surface 152b. The second wall member 152 can include a circumferential third surface 152c disposed between the axially inner surface 152a and the axially outer surface 152b (e.g., defining the second bore 162). The fourth wall member 154 can define a radially inner surface 154a, and an opposing radially outer surface 154b. The third wall member 153 can define a radially inner surface 153a, and an opposing radially outer surface 153b. In non-limiting aspects, the third wall member 153 can be coupled at a first end to the axially outer surface 151b of the first wall member 151, and coupled at a second opposing end to the axially inner surface 152a of the second wall member 152.

In non-limiting aspects, the third wall member 153 can define an annular structure. In non-limiting aspects, the first apertures 163 defined through the third wall member 153 can be circumferentially-spaced from each other. The set of first apertures 163 can be in fluid communication with the first cavity 171 and the second cavity 172. For example, the set of first apertures 163 can extend radially from the radially inner surface 153a to the opposing radially outer surface 153b. In this way, the first cavity 171 can be arranged in fluid communication with the second cavity 172 via the set of first apertures 163.

In some non-limiting aspects, the second wall member 152 can define a set of second apertures 167 therethrough. Similarly, in non-limiting aspects the set of second apertures 167 can be circumferentially spaced from each other. The set of second apertures 167 can be in fluid communication with the second cavity 172 and an exterior of the coil containment collar 150. For example, the set of second apertures 167 can extend axially from the axially inner surface 152a to the opposing axially outer surface 152b.

In non-limiting aspects, the first wall member 151 can define a set of cutouts or first channels 181 defined thereon in fluid communication with the rotatable shaft 40. For example, the set of first channels 181 can extend radially from the third surface 151c of the first wall member 151 (i.e., facing the rotatable shaft 40) to the radially inner surface 153a of the third wall member 153. Each first channel 181 can define a first radially inner end 181a and a first radially outer end 181b. The first radially inner end 181a can be defined at the third surface 151c of the first wall member 151, and the corresponding first radially outer end 181b can be defined proximal the radially inner surface 153a of the third wall member 153. In non-limiting aspects, the first channels 181 can be circumferentially-spaced from each other. In some aspects, the first channels 181 can be formed as a set of grooves on the axially outer surface 151b of the first wall member 151. In this way, the first channels 181 can enlarge or expand the size of the first cavity 171. In some aspects, the set of first channels 181 can be arranged in fluid communication with the set of first apertures 163.

Additionally, or alternatively, in non-limiting aspects, the second wall member 152 can define a set of cutouts or second channels 182 in fluid communication with the rotatable shaft 40. For example, the set of second channels 182 can extend radially from the third surface 152c of the second wall member 152 (i.e., facing the rotatable shaft 40) to the radially inner surface 153a of the third wall member 153. Each second channel 182 can comprise a second radially inner end 182a and a second radially outer end 182b. The second radially outer end 182b can be defined at the third surface 152c of the second wall member 152, and the corresponding second radially outer end 182b can be defined proximal the radially inner surface 153a of the third wall member 153. In non-limiting aspects, the second channels 182 can be circumferentially-spaced from each other. In some aspects, the second channels 182 can be formed as a set of grooves on the axially inner surface 152a of the second wall member 152. In this way, the second channels 182 can enlarge or expand the size of the first cavity 171. In some aspects, the set of second channels 182 can be arranged in fluid communication with the set of first apertures 163.

In non-limiting aspects, the third wall member 153 can be disposed between the first wall member 151 and the second wall member 152, and extend therebetween. In non-limiting aspects, the second wall member 152 can be coupled to the fourth wall member 154. The fourth wall member 154 can be radially spaced from and circumscribe the third wall member 153. In non-limiting aspects, the first wall member 151 and the second wall member 152, can be arranged substantially orthogonal to the third wall member 153 or the fourth wall member 154, or both.

The second cavity 172 can define a first radial length LR1. In non-limiting aspects, the first radial length LR1 can be based on a distance between the radially outer surface 153b of the third wall member 153 and the radially inner surface 154a of the fourth wall member 154. Additionally, in non-limiting aspects, the second cavity 172 can define a first axial length LA1. In non-limiting aspects, the first axial length LA1 can be based on a distance between the axially inner surface 152a of the second wall member 152 and open end 172a of the second cavity 172. In some aspects, the first axial length LA1 and the first radial length LR1 can be configured to cooperatively define a volume or space sized to operatively receive the rotor winding end turns 112 or overhang 114 therein.

It will be appreciated that aspects as disclosed herein are not limited to any specific number of rotor poles, and aspects can be adapted to rotor assemblies 96 having any desired number of poles.

FIG. 6 illustrates a portion of the rotor assembly 96 of FIG. 4 for better understanding the cooling system 80 and fluid coolant flow 85 from the rotatable shaft 40 to the set of rotor winding end turns 112 and the set of stator winding end turns 92. As will be described in more detail herein, the fluid coolant flow 85 can be channeled or conveyed to the rotor winding end turns 112 via the coil containment collar 150.

As shown, the first cavity 171 can be disposed to at least partially underlie the rotor winding end turns 112. In this example, "underlie" denotes a relative position radially closer to the rotational axis 41 of the rotatable shaft 40. In non-limiting aspects, the fourth wall member 154 can be disposed to at least partially overlie the rotor winding end turns 112. In this example, "overlie" denotes a relative position radially farther from the rotational axis 41 of the rotatable shaft 40.

For example, the overhang 114 defined by the bight portions 113 of the rotor winding end turns 112 can be received through the second open end 172a and disposed at least partially within the second cavity 172. In this way, the overhang 114 can be at least partially supported or contained by the coil containment collar 150. In non-limiting aspects, the third wall member 153 can be disposed to confront the lower surface 114b, the second wall member 152 can be disposed to confront the end 114c, and the fourth wall member 154 can be disposed to confront the upper surface 114a.

The rotatable shaft 40 defines a first coolant conduit 140 fluidly connected with a source of coolant 165. The source of coolant 165 can be, but is not limited to the cooling fluid inlet port (see FIGS. 2 and 3). The direction or location of the source of coolant 165 is not limited by the illustration and can be considered in any location that is fluidly coupled to the first coolant conduit 140. It is further considered that additional conduit, pumps, valves, or other devices can be included to fluidly connect the source of coolant 165 and the first coolant conduit 140.

The first and second bores 161, 162 can be sized to receive the rotatable shaft 40 therethrough, and to receive the fluid coolant flow 85 therefrom. The coil containment collar 150 can be fixedly coupled to the rotatable shaft 40 using one or more bolts, screws, pins, keys, or other known fasteners. In other non-limiting aspects, the coil containment collar 150 can be coupled to the rotatable shaft 40 via an interference, friction, or press-fit engagement between coil containment collar 150 and the rotatable shaft 40. For example, the third surface 151c of the first wall member 151, or the third surface 152c of the second wall member 152, or both, can be fixedly coupled to the rotatable shaft 40. Other aspects are not so limited, and it is contemplated that the coil containment collar 150 can be rotatably coupled to the rotatable shaft 40 by any desired affixing mechanisms. It will be appreciated that when so coupled, a rotation of the rotatable shaft 40 will result in rotation of the coil containment collar 150.

In operation, the fluid coolant flow 85 can enter the rotatable shaft 40 of the rotor assembly 96 via the inlet port 82 (see FIGS. 2 and 3). The rotatable shaft 40 at least in part, can define the first coolant conduit 140, through which the fluid coolant flow 85 can flow radially outward from the rotational axis 41 due to the centrifugal force effects of the rotatable shaft 40. A first radial coolant passage 144, by way of extending radially through the rotatable shaft 40, can fluidly couple the first coolant conduit 140 and the coil containment collar 150.

In operation, the coil containment collar 150 can receive the fluid coolant flow 85 from the first radial coolant passage 144 via the first cavity 171. In non-limiting aspects, the fluid coolant flow 85 can collect or accumulate on the first wall member 151 or second wall member 152, or both. As such, the first cavity 171, the first wall member 151, the second wall member 152, or combinations thereof, can operatively define a coolant reservoir. The fluid coolant flow 85 can then be centrifugally conveyed to the set of first apertures 163.

The fluid coolant flow 85 can be further conveyed through the first apertures 163 (i.e., radially, from the radially inner surface 153a to the opposing radially outer surface 153b) and thus from the first cavity 171 to the second cavity 172 via the set of first apertures 163.

In this way, the fluid coolant flow 85 can be received by the rotor winding end turns 112 disposed in the second cavity 172, and coupled in fluid communication with the first apertures 163 to operatively receive the fluid coolant flow 85 therefrom.

As shown, the rotor winding end turns 112 can include a set of rotor end turn passages 156. As used herein, the set of radial rotor end turn passages 156 refers to a set of radially-extending passages defined between the rotor windings 110. In non-limiting aspects, the set of rotor end turn passages 156 can fluidly couple the second cavity 172 to the coolant outlet 169. For example, in non-limiting aspects, the rotor end turn passages 156 can include the respective channel 116 (see FIG. 4) extending through a bight portion 113 defined by a respective rotor winding end turn 112. In some aspects, the respective channel or passages 156 can extend radially from the third wall member 153 to the fourth wall member 154.

In one non-limiting example, the second cavity 172 can be configured to overlie the set of first apertures 163, such that coolant fluid expelled from the first apertures 163 is received by the second cavity 172. The second cavity 172 can be configured to direct, in a radial and/or axial direction, the fluid coolant flow 85 received from the first cavity 171 via the set of first apertures 163. As such, the fluid coolant flow 85 is reliably delivered radially from the first cavity 171 to the second cavity 172, and thus to the rotor winding end turns 112 or the radial rotor end turn passages 156.

In non-limiting aspects, a gap or coolant outlet 169 can cooperatively be defined by the coil containment collar 150 and the rotor core 100. In non-limiting aspects, the coolant outlet 169 can be in fluid communication with the set of rotor end turn passages 156. The coolant outlet 169 can be disposed at an outer circumference 170 of the rotor assembly 96. Optionally, the coolant outlet 169 can define a nozzle (not shown) configured to direct the fluid coolant flow 85 toward the set of stator windings 90 or the set of stator winding end turns 92 (see FIG. 3). The coolant outlet 169 can be at least partially defined by, in contact with, or coupled to an insulating layer 128 located axially between at least part of the rotor core 100 and the coil containment collar 150.

In operation, the fluid coolant flow 85 can be centrifugally conveyed from the first apertures 163 to the rotor end turn passages 156. The fluid coolant flow 85 can then be conveyed toward the coolant outlet 169, such as in an axially inward direction (e.g., toward the rotor core 100).

In this way, the coolant outlet 169 can receive the fluid coolant flow 85 from the second cavity 172. For example, in non-limiting aspects, the second cavity 172 can be in fluid communication with the coolant outlet 169 via the radially inner surface 154a of the fourth wall member 154 such that the rotation of the rotatable shaft 40 about the rotational axis 41 radially expels the fluid coolant flow 85 past the rotor winding end turns 112 and radially outward from the rotor assembly 96.

In non-limiting aspects, in operation, the set of second apertures 167 can additionally provide cooling air or oil mist to the rotor winding end turns.

During operation of the generator 14, the rotation of the magnetic field generated by the set of main machine rotor windings 110 relative to the set of main machine stator windings 90 generates electricity in the main machine stator windings 90. This magnetic interaction further generates heat in the set of main machine rotor windings 110 and main machine stator windings 90. In accordance with aspects described herein, fluid coolant flow 85 can enter the rotatable shaft 40 of the rotor assembly 96 via the inlet port 82. The rotatable shaft 40 at least in part, can define the first coolant conduit 140, through which fluid can flow radially outward from the rotational axis 41. The fluid coolant flow 85 can then be expelled axially into passages defined in the rotor core 100. Additionally, or alternatively, fluid from the first coolant conduit 140 can pass through the first radial coolant passage 144 to be radially received by the coil containment collar 150 and distributed to the first cavity 171.

Fluid can continue to flow radially outward through the first cavity 171 and through the first apertures 163, and to the radial rotor end turn passages 156 that pass between the rotor winding end turns 112 to thereby transfer heat from the set of rotor windings 110 into the fluid coolant flow 85 by conduction. This heat transfer by conduction can remove heat from the rotor windings 110 into the coolant 85. The coolant 85 can be radially expelled from the radial rotor end turn passages 156 into the second cavity 172, where it further can collect at the radially inner surface 154a of the fourth wall member 154. The radially inner surface 154a of the fourth wall member 154 can redirect the fluid coolant flow 85 to the coolant outlet 169, where it is further radially expelled outward to contact the set of main machine stator windings 90. This contacting further removes heat from the main machine stator windings 90 by transferring the heat into the fluid coolant flow 85.

Figure 7:
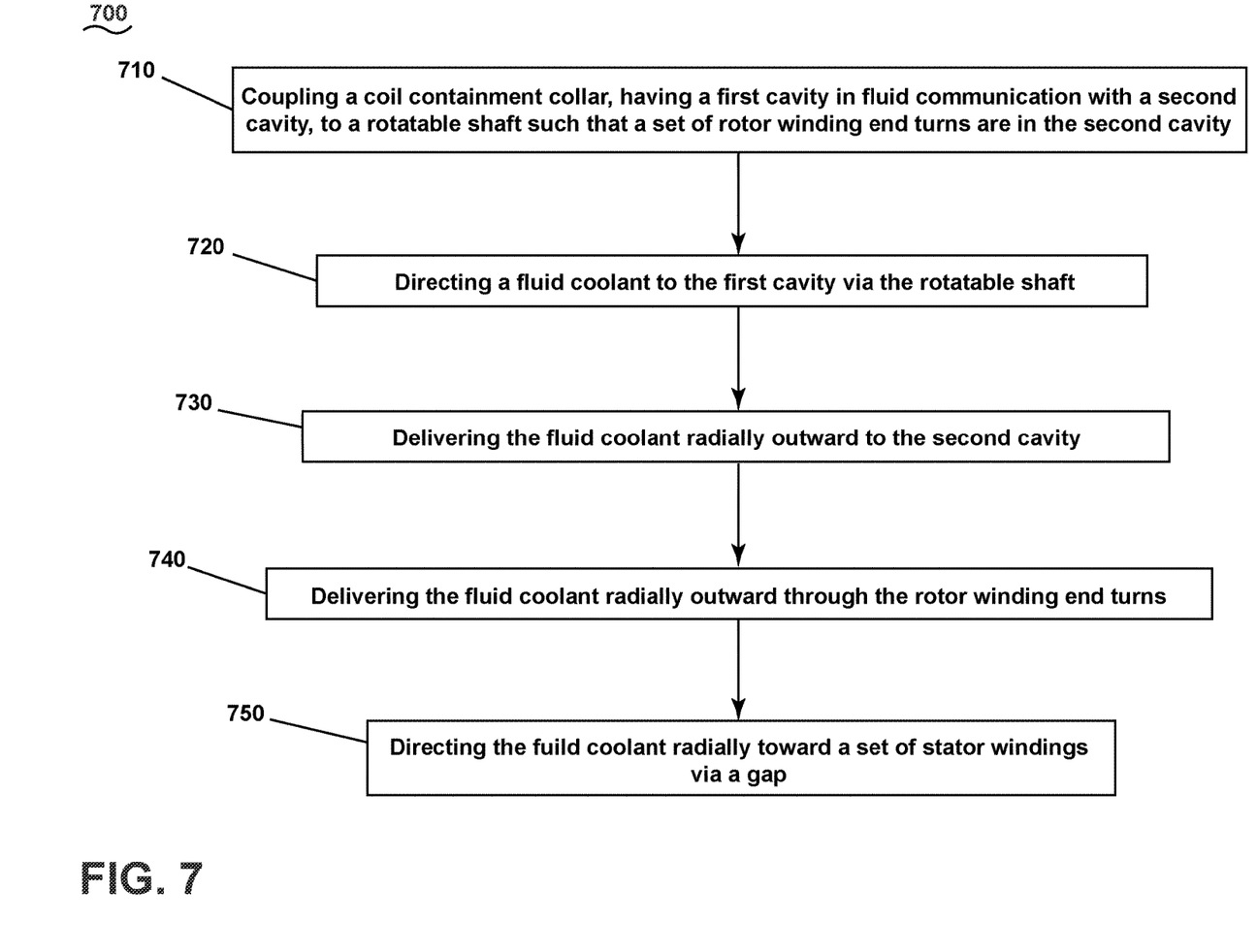
FIG. 7 illustrates an exemplary method of cooling a rotor winding end turn, in accordance with various aspects described herein.

FIG. 7 illustrates a method 700 of cooling a rotor assembly 96 having rotor winding end turns 112 defining a set of radial rotor end turn passages 156. While the method is described with reference to the rotor assembly 96 and coil containment collar 150 of FIGS. 4-6, other aspects are not so limited.

The method can begin at step 710, by rotatably coupling the coil containment collar 150 having the first cavity 171 in fluid communication with the second cavity 172, to the rotatable shaft 40, such that the first cavity 171 is in fluid communication with the rotatable shaft 40, and the rotor winding end turns 112 are at least partially enclosed by the second cavity 172.

The method 700 includes at step 720 directing a fluid coolant flow 85 to the coil containment collar 150. A non-limiting example of directing the fluid coolant flow 85 by the coil containment collar 150 can include directing the fluid coolant flow 85 from the first coolant conduit 140 radially through the first radial coolant passage 144 and into the first cavity 171. Another non-limiting example of directing the fluid coolant flow 85 to the coil containment collar 150 can include directing the fluid coolant flow 85 radially through the first radial coolant passage 144 to the first cavity 171.

In non-limiting aspects, the method can include at step 730, delivering the fluid coolant flow 85, by the coil containment collar 150 radially outward to the second cavity 172. A non-limiting example of delivering the fluid coolant flow 85, radially outward toward the second cavity 172 can include directing the fluid coolant flow 85 through the set of first apertures 163 to the second cavity 172

In other non-limiting aspects, the method 200 can include at step 740, delivering the fluid coolant flow 85, radially outward to the rotor winding end turns 112. A non-limiting example of delivering the fluid coolant flow 85, radially outward to the rotor winding end turns 112 can include directing the fluid coolant flow through the set of rotor end turn passages 156 defined by the rotor winding end turns 112.

At step 750, the method can include expelling or directing the fluid coolant flow 85 from the end turn passages 156 to the coolant outlet 169. The directing by the from the end turn passages 156 to the coolant outlet 169 allows the fluid coolant flow 85 to flow radially outward from the rotor assembly 96 toward a set of stator windings 90.

The set of radial rotor end turn passages 156 are in a thermally conductive relationship with the set of rotor winding end turns 112 so heat from the set of rotor winding end turns 112 is transferred by conduction to the fluid coolant flow 85. The conduction of heat to the fluid coolant flow 85 and the thermally conductive relationships described herein can result in the fluid coolant flow 85 removing heat from the rotor assembly 96.

Many other possible aspects and configurations in addition to that shown in the above figures are contemplated by the present disclosure. For example, one aspect of the disclosure contemplates coolant conduits that extend along alternative portions or lengths of the set of rotor windings 110. In another example, the windings or the coolant conduits can further include intervening thermally conductive layers to assist in thermal conduction while, for example, avoiding an electrically conductive relationship between respective components. Additionally, the design and placement of the various components such as valves, pumps, or conduits can be rearranged such that a number of different in-line configurations could be realized.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

The aspects disclosed herein provide method and apparatus for cooling a set of rotor windings or a set of rotor winding end turns during electric machine operations (e.g. motor or generator operations). One advantage that may be realized in the above aspects is that the above described aspects have significantly improved thermal conduction to remove heat from the set of rotor windings or the set of rotor winding end turns. The improved thermal conductivity between the set of rotor winding end turns and the coolant conduits coupled with the coolant channels provide for heat removal in a much more effective fashion from the rotor winding end turns to the coolant.

The increased thermal dissipation of the rotor winding end turns allows for a higher speed rotation, which may otherwise generate too much heat. The higher speed rotation may result in improved power generation or improved generator efficiency without increasing generator size. The described aspects having the fluid channels for the wet cavity machine are also capable of cooling the stator windings or end turn segments which further reduces thermal losses of the electric machine. Reduced thermal losses in the electric machine allows for greater efficiency and greater power density of the generator.

When designing aircraft components, reliability is an important feature. The above described end assembly can provide additional physics stability and improved cooling to the rotor end windings. The stability and cooling provided by the coil containment collar allow an increase in performance and reliability.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. Further aspects of the disclosure are provided by the subject matter of the following clauses:

A rotor assembly 96 for an electric machine 14 comprising: a rotor core 100 defining a set of circumferentially-spaced, axially-extending slots 108 thereon; a set of rotor windings 110 disposed within the slots 108 having an axial winding portion 111 extending axially along the rotor core 100, and defining a set of rotor winding end turns 112 extending axially beyond the rotor core 100 to define an overhang 114 with upper and lower surfaces 114a, 114b connected by an end 114c; a coil containment collar 150 coupled to the rotor core 100, the coil containment collar 150 comprising: a first wall member 151 confronting the rotor core 100; a second wall member 152 axially spaced from and opposing the first wall member 151; a third wall member 153 extending from the first wall member 151 to the second wall member 152 defining a set of first apertures 163 therethrough; a first cavity 171 cooperatively defined by the first wall member 151, second wall member 152, and third wall member 153, the first cavity 171 having a first opening 171a opposing the third wall member 153; a fourth wall member 154 opposingly spaced from and circumscribing the third wall member 153; a second cavity 172 cooperatively defined by the second wall member 152, third wall member 153 and fourth wall member 154, the second cavity 172 having a second opening 172a opposing the second wall member 152; wherein the first cavity 171 is in fluid communication with the second cavity 172, and the overhang 114 is receivable into the second cavity 172 via the second opening 172a; and wherein the overhang 114 is disposed in the second cavity 172, and the first cavity 171 is in fluid communication with the second cavity 172.

The rotor assembly 96 of the preceding clause, wherein the third wall member 153 is disposed to confront the lower surface 114b, the second wall member 152 is disposed to confront the end 114c, and the fourth wall member 154 is disposed to confront the upper surface 114a.

The rotor assembly 96 of any preceding clause, further comprising a rotatable shaft 40, wherein the first wall member 151 and second wall member 152 are coupled thereto at a respective end, distal from the third wall member 153.

The rotor assembly 96 of any preceding clause, wherein the rotatable shaft 40 defines at least one coolant passage 144 in fluid communication with the first cavity 171.

The rotor assembly 96 of any preceding clause, wherein the first wall member 151 further comprises a first bore 161 defined therethrough, the second wall member 152 comprises a second bore 162 defined therethrough, and wherein the rotatable shaft 40 is received through the first and second bores 161, 162.

The rotor assembly 96 of any preceding clause, wherein the third wall member 153 separates the first cavity 171 from the second cavity 172.

The rotor assembly 96 of any preceding clause, wherein the first cavity 171 is in fluid communication with the second cavity 172 via the set of first apertures 163.

The rotor assembly of any preceding clause, wherein the first cavity 171 includes at least one of a first channel 181 defined on the first wall member 151 and a second channel 182 defined on the second wall member 152.

The rotor assembly 96 of any preceding clause, wherein the overhang 114 defines a passage (116) extending between the third wall member 153 and the fourth wall member 154 within the second cavity 172.

The rotor assembly 96 of any preceding clause, wherein the passage (116) is in fluid communication with the set of first apertures 163.

The rotor assembly 96 of any preceding clause, wherein the second wall member 152 defines a set of circumferentially spaced second apertures (167) defined therethrough in fluid communication with the second cavity 172.

A coil containment collar 150 coupleable to a rotatable shaft 40 of an electric machine 14 having a rotor core 100 including a set of rotor winding end turns 112 extending therefrom, comprising: a first wall member 151 confronting the rotor core 100; a second wall member 152 axially spaced from and opposing the first wall member 151; a third wall member 153 extending from the first wall member 151 to the second wall member 152 defining a set of first apertures 163 therethrough; a first cavity 171 cooperatively defined by the first wall member 151, second wall member 152, and third wall member 153, the first cavity 171 having a first opening 171a opposing the third wall member 153; a fourth wall member 154 opposingly spaced from and circumscribing the third wall member 153; a second cavity 172 cooperatively defined by the second wall member 152, third wall member 153 and fourth wall member 154, the second cavity 172 having a second opening 172a opposing the second wall member 152; wherein the first cavity 171 is in fluid communication with the second cavity 172, and the rotor winding end turns 112 are receivable into the second cavity 172 via the second opening 172a.

The coil containment collar 150 of any preceding clause, wherein the first cavity 171 is at least partially defined by at least one of a first channel 181 defined on the first wall member 151 and a second channel 182 defined on the second wall member 152.

The coil containment collar 150 of any preceding clause, wherein the first wall member 151 further comprises a first bore 161 defined therethrough, the second wall member 152 comprises a second bore 162 defined therethrough, the first and second bores 161, 162 sized to receive the rotatable shaft 40 therethrough.

The coil containment collar 150 of any preceding clause, wherein the first and second bores 161, 162 are defined at an end of the first and second walls 151, 152, respectively, distal from the third wall member 153.

The coil containment collar 150 of any preceding clause, wherein the rotor winding end turns 112 define a passage (116) therebetween extending between the third wall member 153 and the fourth wall member 154 within the second cavity 172.

The coil containment collar 150 of any preceding clause wherein the passage (116) is in fluid communication with the set of first apertures 163.

The coil containment collar 150 of any preceding clause, wherein the second wall member 152 defines a set of circumferentially spaced second apertures (167) defined therethrough in fluid communication with the second cavity 172.

A method 700 of cooling a set of rotor winding end turns 112 extending from a rotor core 100 of a rotor assembly 96, comprising: coupling a coil containment collar 150 to a rotatable shaft 40 of the rotor assembly 96, the coil containment collar 150 having a first wall member 151 confronting the rotor core 100, a second wall member 152 axially spaced from and opposing the first wall member 151, a third wall member 153 extending from the first wall member 151 to the second wall member 152 defining a set of first apertures 163 therethrough, a first cavity 171 cooperatively defined by the first wall member 151, second wall member 152, and third wall member 153, the first cavity 171 having a first opening 171a opposing the third wall member 153, a fourth wall member 154 opposingly spaced from and circumscribing the third wall member 153, a second cavity 172 cooperatively defined by the second wall member 152, third wall member 153 and fourth wall member 154, the second cavity 172 having a second opening 172a opposing the second wall member 152, wherein the first cavity 171 is in fluid communication with the second cavity 172, and the rotor winding end turns 112 are received into the second cavity 172 via the second opening 172a; directing a fluid coolant flow 85 to the first cavity 171; delivering the fluid coolant flow 85, radially outward toward the second cavity 172; and delivering the fluid coolant flow 85 radially outward through the rotor winding end turns 112.

The method 700 of any preceding clause, further comprising directing, by the coil containment collar 150, the fluid coolant flow 85 axially outward toward a set of stator windings 90 via a gap 169 defined between the coil containment collar 150 and the rotor core 100.

What is claimed is:

1. A rotor assembly for an electric machine comprising:
a rotor core defining a set of circumferentially-spaced, axially-extending slots thereon;
a set of rotor windings disposed within the slots having an axial winding portion extending axially along the rotor core, and defining a set of rotor winding end turns extending axially beyond the rotor core to define an overhang with upper and lower surfaces, connected by an end;
a coil containment collar coupled to the rotor core, the coil containment collar comprising:
a first wall member confronting the rotor core;
a second wall member axially spaced from and opposing the first wall member;
a third wall member extending from the first wall member to the second wall member defining a set of first apertures therethrough;
a first cavity cooperatively defined by the first wall member, second wall member, and third wall member such that one side of the first cavity comprises at least a portion of the second wall member, the first cavity having a first opening opposing the third wall member;
a fourth wall member opposingly spaced from and circumscribing the third wall member;
a second cavity cooperatively defined by the second wall member, third wall member and fourth wall member, the second cavity having a second opening opposing the second wall member;
wherein the first cavity is in fluid communication with the second cavity, and the overhang is receivable into the second cavity via the second opening; and
wherein the overhang is disposed in the second cavity, and the first cavity is in fluid communication with the second cavity.

2. The rotor assembly of claim 1, wherein the third wall member is disposed to confront the lower surface, the second wall member is disposed to confront the end, and the fourth wall member is disposed to confront the upper surface.

3. The rotor assembly of claim 1, further comprising a rotatable shaft, wherein the first wall member and second wall member are coupled thereto at a respective end, distal from the third wall member.

4. The rotor assembly of claim 3, wherein the rotatable shaft defines at least one coolant passage in fluid communication with the first cavity.

5. The rotor assembly of claim 3, wherein the first wall member further comprises a first bore defined therethrough, the second wall member comprises a second bore defined therethrough, and wherein the rotatable shaft is received through the first and second bores.

6. The rotor assembly of claim 1, wherein the third wall member separates the first cavity from the second cavity.

7. The rotor assembly of claim 1, wherein the first cavity is in fluid communication with the second cavity via the set of first apertures.

8. The rotor assembly of claim 1, wherein the first cavity includes at least one of a first channel defined on the first wall member and a second channel defined on the second wall member.

9. The rotor assembly of claim 1, wherein the overhang defines a passage extending between the third wall member and the fourth wall member within the second cavity.

10. The rotor assembly of claim 9, wherein the passage is in fluid communication with the set of first apertures.

11. The rotor assembly of claim 1, wherein the second wall member defines a set of circumferentially spaced second apertures defined therethrough in fluid communication with the second cavity.

12. A coil containment collar coupleable to a rotatable shaft of an electric machine having a rotor core including a set of rotor winding end turns extending therefrom, comprising:
a first wall member confronting the rotor core;
a second wall member axially spaced from and opposing the first wall member;
a third wall member extending from the first wall member to the second wall member defining a set of first apertures therethrough;
a first cavity cooperatively defined by the first wall member, second wall member, and third wall member such that one side of the first cavity comprises at least a portion of the second wall member, the first cavity having a first opening opposing the third wall member;
a fourth wall member opposingly spaced from and circumscribing the third wall member;
a second cavity cooperatively defined by the second wall member, third wall member and fourth wall member, the second cavity having a second opening opposing the second wall member;
wherein the first cavity is in fluid communication with the second cavity, and the rotor winding end turns are receivable into the second cavity via the second opening.

13. The coil containment collar of claim 12, wherein the first cavity is at least partially defined by at least one of a first channel defined on the first wall member and a second channel defined on the second wall member.

14. The coil containment collar of claim 12, wherein the first wall member further comprises a first bore defined therethrough, the second wall member comprises a second bore defined therethrough, the first and second bores sized to receive the rotatable shaft therethrough.

15. The coil containment collar of claim 14, wherein the first and second bores are defined at an end of the first and second walls respectively, distal from the third wall member.

16. The coil containment collar of claim 12, wherein the rotor winding end turns define a passage therebetween extending between the third wall member and the fourth wall member within the second cavity.

17. The coil containment collar of claim 16, wherein the passage is in fluid communication with the set of first apertures.

18. The coil containment collar of claim 12, wherein the second wall member defines a set of circumferentially spaced second apertures defined therethrough in fluid communication with the second cavity.

19. A method of cooling a set of rotor winding end turns extending from a rotor core of a rotor assembly, comprising:
coupling a coil containment collar to a rotatable shaft of the rotor assembly, the coil containment collar having a first wall member confronting the rotor core, a second wall member axially spaced from and opposing the first wall member, a third wall member extending from the first wall member to the second wall member defining a set of first apertures therethrough, a first cavity cooperatively defined by the first wall member, second wall member, and third wall member such that one side of the first cavity comprises at least a portion of the second wall member, the first cavity having a first opening opposing the third wall member, a fourth wall member opposingly spaced from and circumscribing the third wall member, a second cavity cooperatively defined by the second wall member, third wall member and fourth wall member, the second cavity having a second opening opposing the second wall member, wherein the first cavity is in fluid communication with the second cavity, and the rotor winding end turns are received into the second cavity via the second opening;

directing a fluid coolant flow to the first cavity;

delivering the fluid coolant flow, radially outward toward the second cavity; and delivering the fluid coolant flow radially outward through the rotor winding end turns.

20. The method of claim 19, further comprising directing, by the coil containment collar, the fluid coolant flow axially outward toward a set of stator windings via a gap defined between the coil containment collar and the rotor core.

\* \* \* \* \*